(12) United States Patent
Mason et al.

(10) Patent No.: US 10,781,776 B2
(45) Date of Patent: Sep. 22, 2020

(54) OVERMOLDED PLUG AND METHOD

(71) Applicant: Robert Bosch GmbH, Stuttgart (DE)

(72) Inventors: Paul Mason, Dearborn, MI (US); David Toutant, Grosse Pointe Woods, MI (US); Daniel E. Smith, Jr., Brighton, MI (US)

(73) Assignee: Robert Bosch GmbH, Stuttgart (DE)

( * ) Notice: Subject to any disclaimer, the term of this patent is extended or adjusted under 35 U.S.C. 154(b) by 1068 days.

(21) Appl. No.: 14/541,620

(22) Filed: Nov. 14, 2014

(65) Prior Publication Data

US 2015/0129063 A1    May 14, 2015

Related U.S. Application Data

(60) Provisional application No. 61/904,092, filed on Nov. 14, 2013.

(51) Int. Cl.
| | |
|---|---|
| *F02M 37/10* | (2006.01) |
| *B29C 45/14* | (2006.01) |
| *F02M 37/14* | (2006.01) |
| *F02M 37/22* | (2019.01) |
| *B01D 35/26* | (2006.01) |
| *F16L 55/11* | (2006.01) |
| *B29K 101/12* | (2006.01) |
| *B29L 31/00* | (2006.01) |
| *B60K 15/03* | (2006.01) |

(52) U.S. Cl.
CPC ........... *F02M 37/106* (2013.01); *B01D 35/26* (2013.01); *B29C 45/14336* (2013.01); *F02M 37/10* (2013.01); *F02M 37/103* (2013.01); *F02M 37/14* (2013.01); *F02M 37/22* (2013.01); *F16L 55/1133* (2013.01); *B29C 2045/14139* (2013.01); *B29C 2045/14868* (2013.01); *B29K 2101/12* (2013.01); *B29K 2995/0037* (2013.01); *B29L 2031/00* (2013.01); *B60K 2015/03236* (2013.01); *Y10T 137/8085* (2015.04); *Y10T 137/85978* (2015.04); *Y10T 137/86002* (2015.04); *Y10T 137/86027* (2015.04); *Y10T 137/86035* (2015.04)

(58) Field of Classification Search
CPC ....... Y10T 137/8085; Y10T 137/86035; Y10T 137/86002; Y10T 137/86027; F02M 37/106; F02M 37/103; F02M 2037/228; B60K 2015/03236; B01D 35/26; F16L 55/1133; B29C 45/14336; B29C 2045/14139
See application file for complete search history.

(56) References Cited

U.S. PATENT DOCUMENTS

| | | | | |
|---|---|---|---|---|
| 6,062,203 A | * | 5/2000 | Takahashi | F02M 37/22 123/509 |
| 7,631,664 B1 | * | 12/2009 | Mailand | F16L 55/1108 138/89 |
| 2006/0151378 A1 | * | 7/2006 | Goll | B01D 29/111 210/416.4 |

(Continued)

*Primary Examiner* — Atif H Chaudry
(74) *Attorney, Agent, or Firm* — Michael Best & Friedrich LLP

(57) ABSTRACT

A cover of a fuel supply module is adapted to disable a flow path through a designated port. An element is press-fit into the designated port to plug the designated port, and thermoplastic material is molded over an interface defined between the element and the designated port.

4 Claims, 4 Drawing Sheets

(56) References Cited

U.S. PATENT DOCUMENTS

2007/0065315 A1* 3/2007 Nagata ................ F02M 37/048
  417/423.1
2011/0258834 A1* 10/2011 Allen .................... F16L 55/132
  29/525

* cited by examiner

OVERMOLDED PLUG AND METHOD

CROSS-REFERENCE TO RELATED APPLICATIONS

This application claims priority to U.S. Provisional Patent Application No. 61/904,092, filed on Nov. 14, 2013, the entire contents of which are incorporated by reference herein.

BACKGROUND

The invention relates to plugs for blocking fluid ports. Some aspects of the invention also relate to plugging a port within a vehicular fuel supply module.

Fuel supply modules have molded parts with various fluid channels formed therein. With increasingly difficult space constraints in vehicles, fuel tanks can assume complex shapes with small openings and limited space for assembly and mounting of a fuel supply module, and fuel supply modules may need to be designed with special care to reduce dimensions to enable assembly. In some cases, a fuel supply module may be manufactured with a port which is not utilized in all applications. A molded plug may be assembled with the unused port and ultrasonically welded to the port. However, this requires multiple manufacturing steps, and may raise concerns regarding added cost and contamination.

SUMMARY

In one aspect, the invention provides a method of modifying a fuel supply module to disable a flow path. A cover is provided having an interface configured to sealingly engage with a pressure vessel of a fuel supply module, the cover having a plurality of ports configured to define a plurality of flow paths through the cover. An element is press-fit into a designated one of the plurality of ports to plug the designated port. At least a portion of the cover with the element is inserted into a mold cavity, and thermoplastic material is injected into the mold cavity directly around an interface defined between the element and the designated port to overmold the interface, while using the element as a molding core.

In another aspect, the invention provides a fuel supply module including a fuel pump operable to pump fuel when energized. A pressure vessel is coupled to the fuel pump to receive fuel from the fuel pump. A cover coupled to the pressure vessel to enclose a volume defined by the pressure vessel. The cover includes at least three fluid ports and a designated one of the at least three fluid ports is plugged by an element positioned within the designated port. The interface between the element and the designated port is overmolded with thermoplastic material.

DETAILED DESCRIPTION

Before any embodiments of the invention are explained in detail, it is to be understood that the invention is not limited in its application to the details of construction and the arrangement of components set forth in the following description or illustrated in the following drawings. The invention is capable of other embodiments and of being practiced or of being carried out in various ways.

Figure 1:
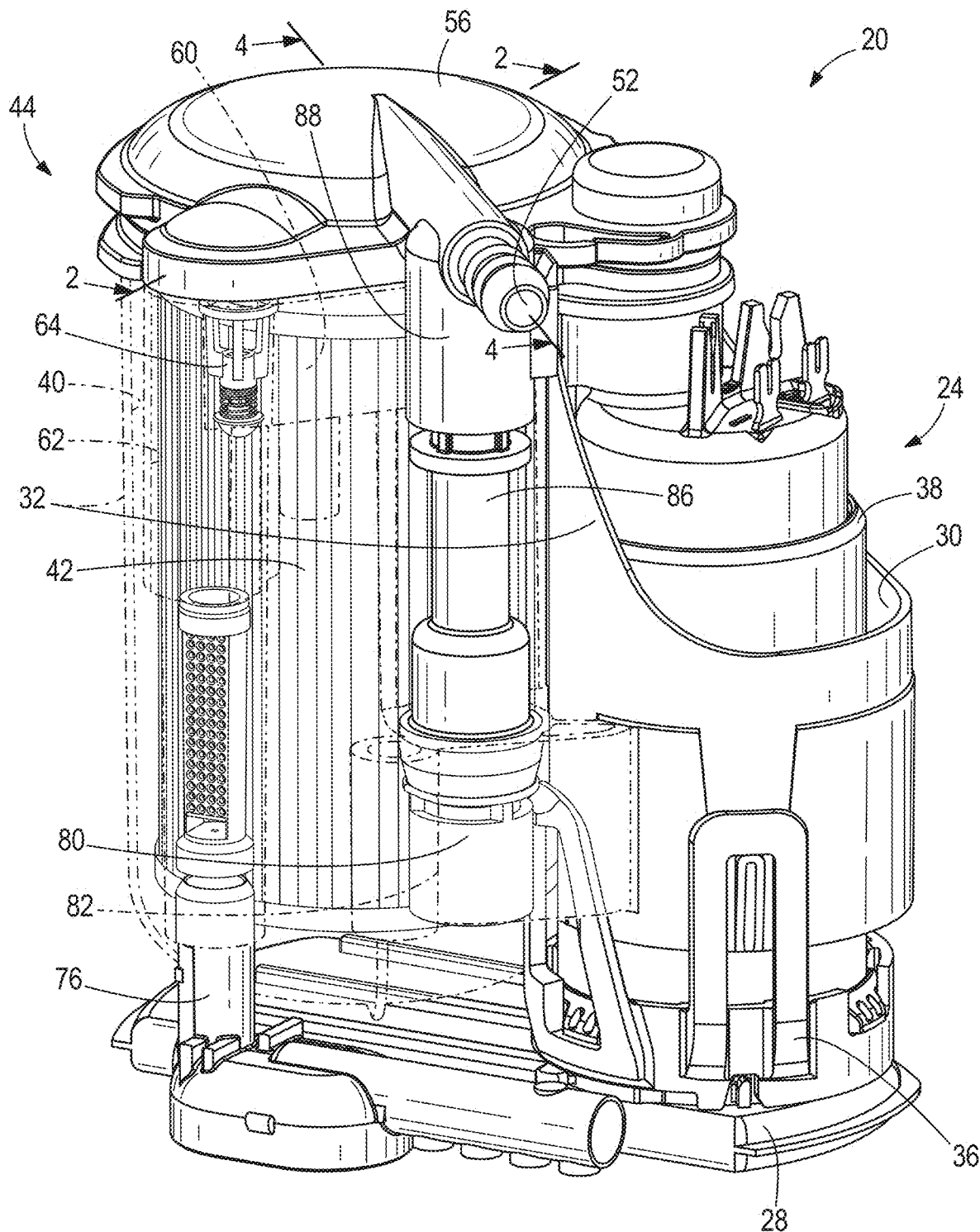
FIG. 1 is perspective view of a fuel pump module.

As shown in FIG. 1, a fuel supply module or fuel pump module 20 includes a fuel pump or "pump unit" 24 operable to pump liquid fuel when energized. The pump module 20 can be positioned inside a fuel tank for supplying fuel to a fuel burning device, such as an internal combustion engine. The pump module 20 is oriented vertically within the tank, with a pump pickup and a coarse filter 28 at a first or bottom end, and an axis of the pump unit 24 arranged upright or vertically. The pump unit 24 is positioned in a receptacle area 30 of a housing 32. The pump unit 24 can be insertable into the receptacle area 30 in the axial or vertical direction and can be retained with a clip 36 or other device. In other constructions, the pump unit 24 may be positioned relative to the housing 32 in other ways. Although positionally retained in relation to the housing 32, the pump unit 24 also includes a case or housing 38 of its own.

Figure 2:
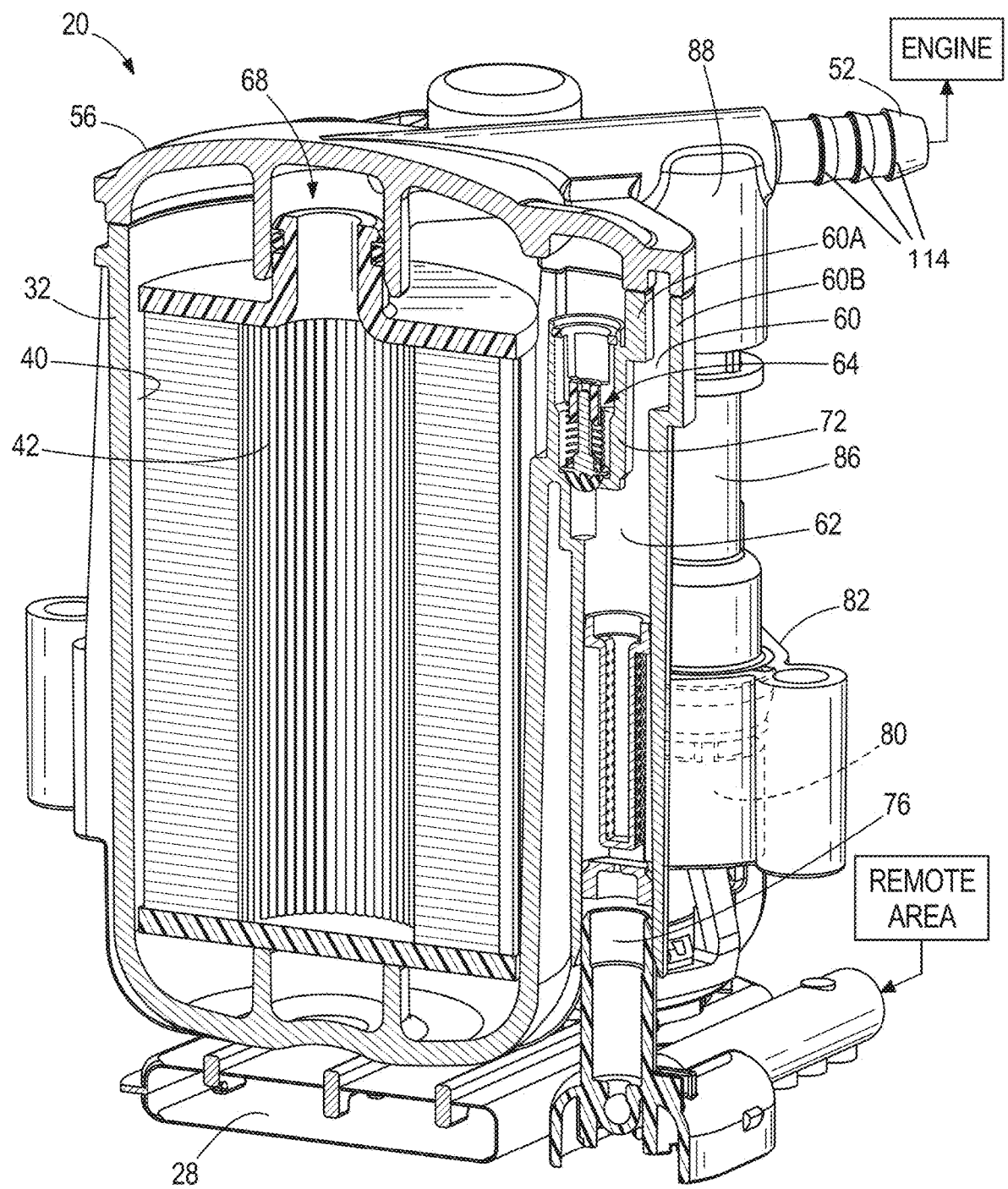
FIG. 2 is a cross-section view of the fuel pump module, taken along line 2-2 of FIG. 1.

The housing 32 defines a pressure vessel 40 receiving the fuel from the pump unit 24. The pressure vessel 40 can constitute a majority portion of the housing 32. In other constructions, the pressure vessel 40 is separate from the structure retaining the fuel pump unit 24, rather than being integrated with the housing 32 to include the receptacle area 30. The pressure vessel 40 can accommodate a fine filter 42 as shown. Fuel is pumped via the pump unit 24 through the pressure vessel 40 (and the fine filter 42, if equipped) and out to the engine or other device. As illustrated in FIGS. 1 and 2, the fuel outlet of the pump module 20 to the engine is via an outlet port 52 or primary supply outlet. The illustrated outlet port 52 is formed integrally as a single piece with a cover 56 located at an upper end of the pressure vessel 40.

Figure 3:
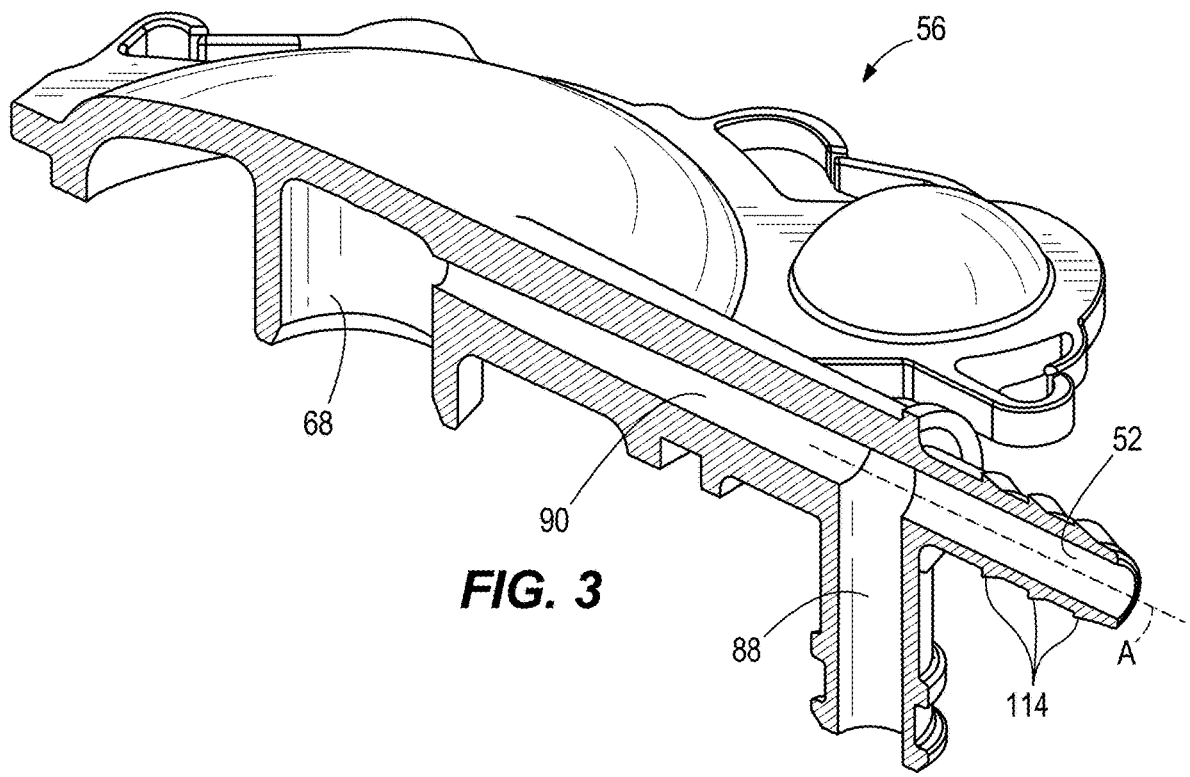
FIG. 3 is perspective view of a cover of the fuel pump module shown in FIGS. 1 and 2.

Fuel is sent from the pump unit 24 directly into a hydraulic channel 60 formed in the housing 32 as shown in FIG. 2. In normal operation, 100 percent or all of the fuel pumped by the pump unit 24 enters the channel 60. The channel 60 receiving the fuel from the pump unit 24 can be located substantially at a radially outward portion of the pressure vessel 40. The channel 60 can extend circumferentially around a portion of the housing 32 (e.g., about one-third or 120 degrees). As illustrated, the channel 60 is positioned at an upper edge of the housing 32 at an outer peripheral portion thereof, and the channel 60 has a rectangular cross-sectional shape, defined in part by a radially inner wall 60A and a radially outer wall 60B. The channel 60 directly borders the pressure vessel 40, with the wall 60A being shared therebetween. The channel 60 terminates at a manifold 62, from which the fuel is directed through a check valve 64, into the pressure vessel 40, exiting through a pressure vessel outlet port 68 and the outlet port 52 of the pump module 20. The check valve 64 can have a receptacle or housing portion 72 that is integrally formed as a single piece with the housing 32 as shown, or constructed as a separate piece as a drop-in component into the housing 32. The housing portion 72 can have a shared wall with the pressure vessel 40 as shown in FIGS. 2 and 3. The check valve 64 allows flow from the pump unit 24 into the pressure vessel 40 and prevents flow in the reverse direction. In the illustrated construction, the flow through the check valve 64 is vertically upward.

From the manifold 62, without first being directed through the check valve 64, or any check valve whatsoever, a portion of the flow from the pump unit 24 can also drive a jet pump 76 to draw fuel toward the immediate area of the pump module 20 from a remote tank area. Thus, any portion of the pumped fuel not directed through the check valve 64 to the pressure vessel 40 is directed through the jet pump 76, and vice versa.

Pressure regulation/relief is achieved with a pressure regulation valve 80 located in communication with an outlet passage 90 positioned between the pressure vessel 40 and the outlet port 52. The housing 32 includes a receptacle 82 integrally formed as a single piece therewith and configured to receive the pressure regulation valve 80. The pressure regulation valve 80 is fluidly coupled with the outlet port 52 via a connection pipe 86, which is coupled between the regulator receptacle 82 at a lower end and a receptacle port 88 of the cover 56 at an upper end. Along with the outlet passage 90, the upper receptacle port 88 can be formed integrally as a single piece with the cover 56 such that the connection pipe 86 is installed into place simultaneously as the cover 56 is assembled with the housing 32. The cover 56 can be assembled with the housing 32 in a sealing manner (e.g., by a hot plate weld process).

Figure 4:
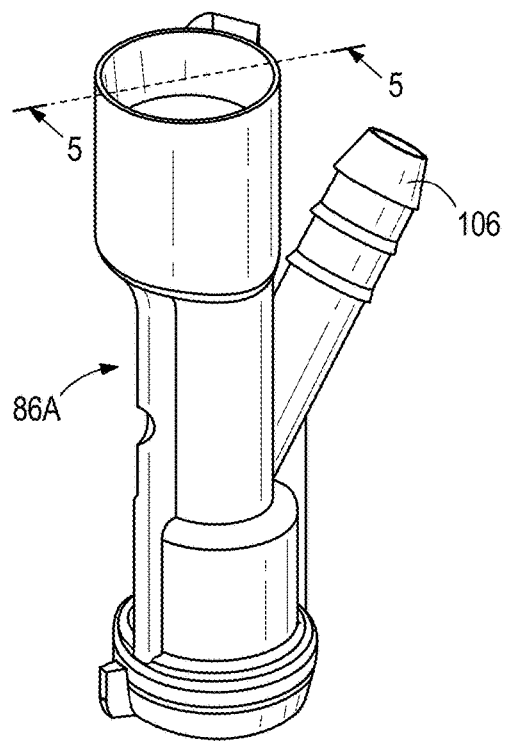
FIG. 4 is a perspective view of an alternate pressure regulating valve tube for use in the fuel pump module.
Figure 5:
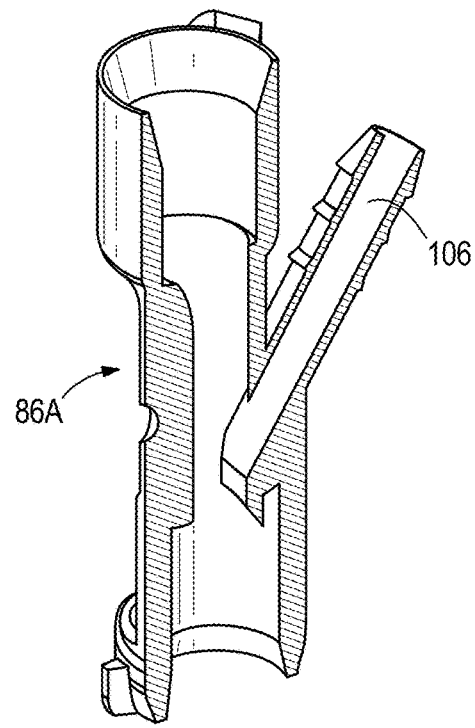
FIG. 5 is a cross-section view of the alternate pressure regulating valve tube, taken along line 5-5 of FIG. 4.

The pump module 20 of FIGS. 1 and 2 and the majority of components thereof, including the cover 56, can be reconfigured for alternate service applications in which the outlet port 52 is disabled or blocked so that it is fluidly sealed shut. In such applications, the outlet port 52 is plugged as discussed below. Blocking of the outlet port 52 of the cover 56 may be done when the pump module 20 is configured for use within a small diameter reservoir that prevents connection of a fluid line to the outlet port 52 due to interference. In such instances, an alternate connection pipe 86A (FIGS. 4 and 5) can be provided coupled to the receptacle port 88 to establish fluid communication with the outlet passage 90 in the cover 56. The alternate connection pipe 86A includes an additional side port 106 serving as the principal or final outlet of the pump module 20, which supplies fuel to the engine or other device. The alternate connection pipe 86A can contain the pressure regulation valve 80 and may be referred to as a pressure regulation valve tube or PRV tube. The side port 106 of the PRV tube 86A is utilized to provide the pump module 20 with a principal or final outlet that is spaced below the cover 56. The side port 106 is angled to direct fuel outward from the main passage of the PRV tube 86A (shown vertical) at an upward angle.

As described above, the cover 56 includes the pressure vessel outlet port 68 that acts as an inlet to the cover 56, receiving fuel from the volume of the pressure vessel 40. The outlet passage 90 of the cover 56 is oriented generally perpendicular to the pressure vessel outlet port 68. The outlet passage 90 intersects with the receptacle port 88, or a passage terminating at the receptacle port 88, and continues past the receptacle port 88 to the outlet port 52. The receptacle port 88 and corresponding passage are generally perpendicular to the outlet passage 90.

Figure 6:
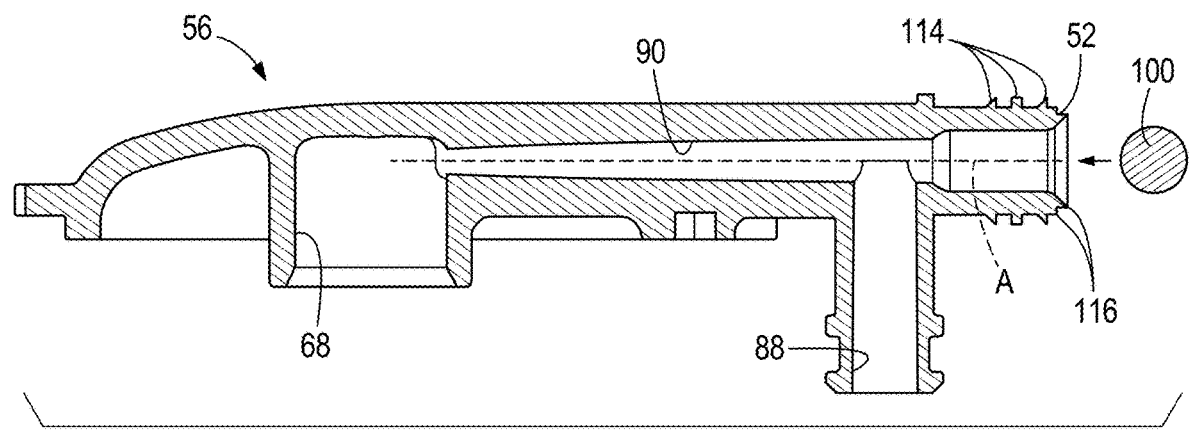
FIG. 6 is a cross-section view illustrating the introduction of a ball into a port of the cover of FIG. 3.
Figure 7:
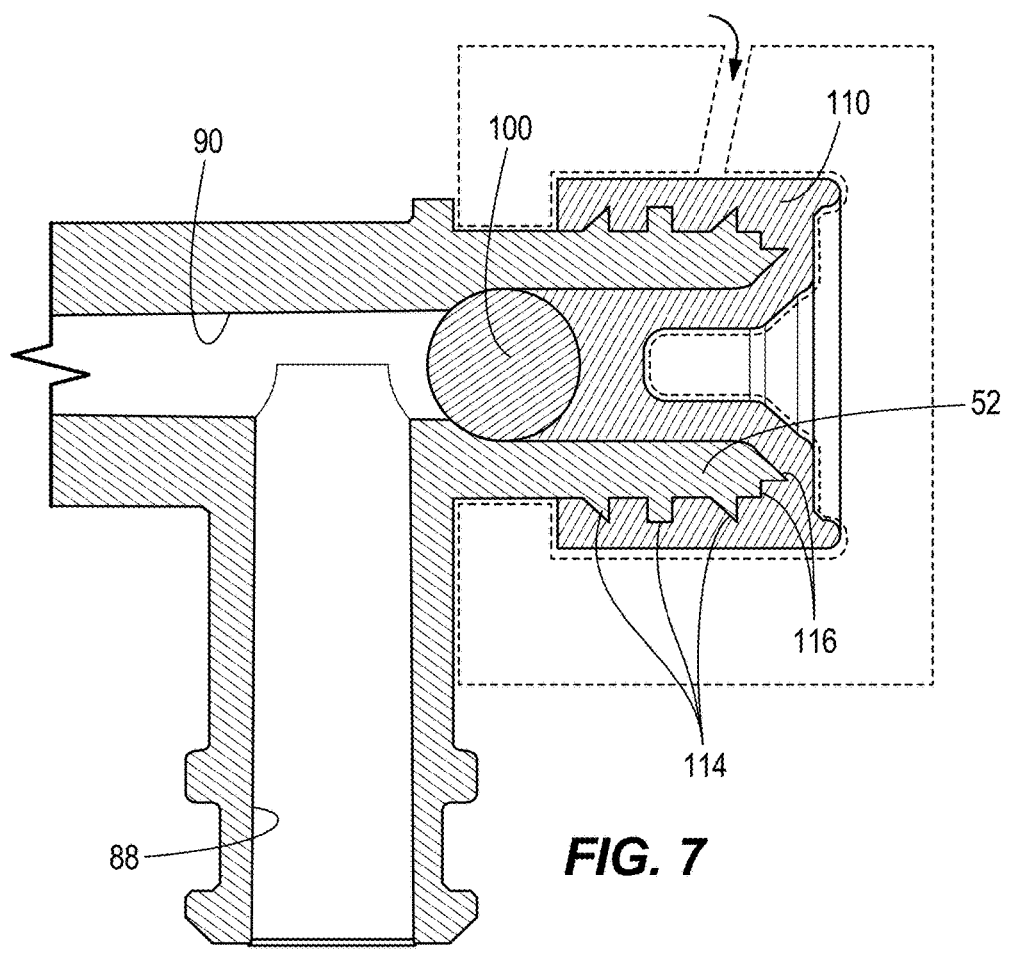
FIG. 7 is a cross-section view illustrating the ball press fit into the port and overmolded with a plug. A molding tool is shown in dashed lines.

In order to block the outlet port 52, a two-part method can be performed. First, an element 100 is inserted into the outlet port 52 as a plug or stopper to block the fluid communication through the outlet port 52. Additionally, as detailed below, the resulting interface between the element 100 and the outlet port 52 can be overmolded with thermoplastic material as shown in FIG. 7. As illustrated in FIGS. 6 and 7, the element 100 can be a ball. The element 100 can be constructed of an engineering thermoplastic such as polyoxymethylene (POM) or similar material. The element 100 can be pressed into the port 52 and used as a pseudo-core for molding the thermoplastic material to form a plug or cap 110, finally closing off the outlet port 52. The element 100 can be slightly larger in diameter than the inner diameter of the port 52 so that a press fit is achieved (e.g., 5 to 6 percent strain). However, in some constructions, the press fit is not configured to or physically able to maintain a fluid seal on its own to maintain sealed fluid blockage of the outlet port 52 during operation at maximum design pressure. Although the element 100 may contribute to the ability to block flow through the outlet port 52, the element 100 can be used primarily as a placeholder that obviates the need for a support core inserted into the receptacle port 88 (which receives the PRV tube 86A) during overmolding of the cap 110. FIG. 7 schematically illustrates an injection molding tool, including a mold cavity, as shown in dashed lines. The arrow indicates the flow of injected liquid thermoplastic material into the mold cavity to form the cap 110. Once overmolding of the cap 110 is complete, the element 100 remains in place.

The cap 110 secures the element 100 against removal and provides a secondary blockage in the outlet port 52 that may provide a majority of the blocking strength against internal fluid pressure. Although the cap 110 can be provided solely inside the outlet port 52 in some constructions, the cap 110 may extend about an exterior of the protruding male portion that forms the outlet port 52. Barbs 114 that may have sharp edges (showing as sharp corners in cross-section) are provided on the outside of the outlet port 52. The sharp edges promote melting and bonding with the overmolded material of the cap 110 during molding. FIGS. 6 and 7 show an alternate arrangement of the barbs 114 having an enhanced array of sharp edges as compared to the basic barb configuration of FIGS. 1-3. The barbs 114 can include a plurality of annular ribs that extend substantially radially outward with respect to an axis A defined by the outlet port 52. At least two of the annular ribs 114 can have different cross-sectional shapes as shown in FIGS. 6 and 7. In addition to the radially extending ribs, additional barbs can provide additional sharp edges 116 adjacent the tip of the protruding male portion. The additional sharp edges 116 are spaced apart with respect to both an axial direction and a radial direction from the various corners defined by the radially extending ribs 114. It should be understood that a variety of different configurations of barbs, ribs, and or sharp corners or edges are contemplated, an exhaustive depiction of which cannot reasonably be included herein.

Mechanical retention of the cap 110 onto the outlet port 52 is also promoted by the shrink rate of the injection molded material forming the cap 110, which can be about 3 percent. The overmolded cap 110 can be a material the same as or similar to the material (e.g., POM) of the element 100 pressed into the outlet port 52.

The process of adapting or re-configuring the cover 56 includes sealing the outlet port 52 closed simultaneously with the molding operation that forms the cap 110. The process further includes utilizing a press fit polymer element 100 as a core for the overmolding operation of the cap 110, with the element 100 remaining in-situ in the final plugged port 52.

What is claimed is:
1. A fuel supply module comprising:
a fuel pump operable to pump fuel when energized;

a pressure vessel coupled to the fuel pump to receive fuel from the fuel pump; and a cover coupled to the pressure vessel to enclose a volume defined by the pressure vessel, wherein the cover includes at least three fluid ports and a designated one of the at least three fluid ports is plugged by an element positioned within the designated port, and wherein the interface between the element and the designated port is overmolded with thermoplastic material, wherein the designated port is defined within a protruding male portion of the cover, and wherein the protruding male portion includes a plurality of barbs, and the plurality of barbs are covered by the overmolded thermoplastic material.

2. The fuel supply module of claim 1, wherein the plurality of barbs includes a plurality of annular ribs that extend substantially radially outward with respect to an axis defined by the designated port.

3. The fuel supply module of claim 2, wherein at least two of the plurality of annular ribs have different cross-sectional shapes.

4. The fuel supply module of claim 1, wherein the plurality of barbs define a plurality of sharp corners spaced apart with respect to both an axial direction and a radial direction, the axial direction being defined by an axis of the designated port.

\* \* \* \* \*